(12) United States Patent
Zhang et al.

(10) Patent No.: US 7,739,725 B1
(45) Date of Patent: *Jun. 15, 2010

(54) METHOD AND SYSTEM TO GRANT INDEFINITE USE OF SOFTWARE OPTIONS RESIDENT ON A DEVICE

(75) Inventors: Kun Zhang, Waukesha, WI (US); Karamjeet Singh, Germantown, WI (US); William G. Blair, Waukesha, WI (US); Winnie C. Durbin, Dousman, WI (US); Michael R. Minogue, Milwaukee, WI (US)

(73) Assignee: GE Medical Technology Services, Inc., Pewaukee, WI (US)

( * ) Notice: Subject to any disclaimer, the term of this patent is extended or adjusted under 35 U.S.C. 154(b) by 1304 days.

This patent is subject to a terminal disclaimer.

(21) Appl. No.: 11/162,680

(22) Filed: Sep. 19, 2005

Related U.S. Application Data

(63) Continuation of application No. 09/681,478, filed on Apr. 13, 2001, now Pat. No. 6,983,375.

(51) Int. Cl.
*G06F 7/04* (2006.01)
*G06F 15/16* (2006.01)
*G06F 17/30* (2006.01)
*G06F 29/06* (2006.01)

(52) U.S. Cl. .................. 726/4; 726/2; 726/19; 726/35; 713/1; 713/155; 713/182; 709/229; 707/9

(58) Field of Classification Search .............. 713/1, 713/182, 155; 726/2, 19, 4; 707/9; 709/229
See application file for complete search history.

(56) References Cited

U.S. PATENT DOCUMENTS 4,914,686 A * 4/1990 Hagar et al. ............... 455/405
5,003,965 A * 4/1991 Talish et al. ............... 601/2

(Continued)

FOREIGN PATENT DOCUMENTS

JP 2000148313 * 5/2000

(Continued)

OTHER PUBLICATIONS

IBM, Remote Activation of Computer Terminals, May 1, 1982, IBM Technical Disclosure Bulletin, vol. 24, Issue 12, pp. 6309-6310.*

*Primary Examiner*—Kambiz Zand
*Assistant Examiner*—Tongoc Tran
(74) *Attorney, Agent, or Firm*—Ziolkowski Patent Solutions Group, SC

(57) ABSTRACT

A system for granting indefinite use of inactivated software options pre-installed on a device is provided. The system includes receiving, at a remote processing facility, a recurrent use request from a user requesting access to an inactivated software option resident on the device. The system is further configured to validate the request and generate an activation key. The activation key is transmitted from the processing facility to the device automatically activating the option and granting recurrent access. The activation key or code is generated at the processing facility using data from at least one of a user identifier, a system identifier, a recurrent use identifier, and the selected option. A method to permit recurrent use of resident, yet, inactivated software of a device is also provided.

23 Claims, 2 Drawing Sheets

U.S. PATENT DOCUMENTS

| | | | |
|---|---|---|---|
| 5,442,541 A * | 8/1995 | Hube et al. ................... 700/9 |
| 5,960,085 A | 9/1999 | De la Huerga |
| 6,249,868 B1 | 6/2001 | Sherman et al. |
| 6,301,666 B1 | 10/2001 | Rive |
| 6,377,162 B1 * | 4/2002 | Delestienne et al. ... 340/286.07 |
| 6,381,557 B1 * | 4/2002 | Babula et al. ............... 702/183 |
| 6,480,762 B1 | 11/2002 | Uchikubo et al. |
| 6,490,684 B1 * | 12/2002 | Fenstemaker et al. ....... 713/182 |
| 6,523,067 B2 | 2/2003 | Mi et al. |
| 6,558,321 B1 | 5/2003 | Burd et al. |
| 6,564,104 B2 | 5/2003 | Nelson et al. |
| 6,581,069 B1 * | 6/2003 | Robinson et al. ......... 707/104.1 |
| 6,594,765 B2 | 7/2003 | Sherman et al. |
| 6,694,384 B1 * | 2/2004 | Moeller et al. ................. 710/8 |
| 6,829,704 B2 * | 12/2004 | Zhang et al. ................... 713/1 |
| 2001/0032098 A1 * | 10/2001 | Kulkarni ........................ 705/2 |
| 2001/0039504 A1 * | 11/2001 | Linberg et al. ................. 705/3 |

FOREIGN PATENT DOCUMENTS

WO      WO 99/25086      5/1999

* cited by examiner

METHOD AND SYSTEM TO GRANT INDEFINITE USE OF SOFTWARE OPTIONS RESIDENT ON A DEVICE

CROSS-REFERENCE TO RELATED APPLICATION

The present application is a continuation and claims priority to U.S. Ser. No. 09/681,478.

BACKGROUND OF THE INVENTION

The present invention relates generally to a method and a system to enable software, and more particularly, to a method and system to remotely grant indefinite access to previously inactivated software options resident in memory of a device.

Information exchange between a centralized facility and remote medical diagnostic devices and supporting systems, such as medical imaging systems, has steadily improved in recent years. Examples of some medical devices and systems capable of exchanging information remotely include magnetic resonance imaging (MRI) systems, computed tomography (CT) systems, ultrasound and x-ray systems, and positron emission tomography (PET) systems. Typically, these systems are factory configured with several activated options including options that a particular customer may not utilize. Some known systems permit a user to "configure" a device to its needs, but these systems require the user to determine and, often, guess as to what features will be needed in the future. To further complicate matters, customers owning multiple devices often network these devices even though they have different options activated.

Known systems attempt to sense on-going customer needs by arranging for service technicians to physically travel to the location of the device, install and enable the option as well as calibrate the device to ensure proper operation. Requiring a service technician to physically visit the device results in unnecessary delay and device down-time.

Further advancements provide remote service to medical diagnostic systems in an effort to allow a level of service on a continual and interactive basis as needed by many facilities. In one such system, a facility can interactively receive messages via a network and can respond automatically to the messages if configured correctly. Data required to analyze the state of operation of the medical diagnostic devices can be transferred during an electronic connection. This technique greatly facilitates identification of system problems, allows questions to be posed to the subscribing service provider, facilitates transfer of updates and imaging protocols, and permits standard and customized reports to be transmitted to subscribing systems or stations. The interactive aspect of this technique allows the medical diagnostic facility to remain current on services provided by the centralized service facility and to readily communicate with the centralized facility.

While such advancements in the provision of remote services to medical diagnostic devices have greatly enhanced the level of service and information exchange, they have not been used to grant indefinite access to a software option resident in memory of a device in a secure and proficient manner.

There is a need for a system where a customer would have the ability to request indefinite access to and use of an inactivated option preinstalled in memory of a device remotely located from a centralized facility. Often, healthcare or other facilities may desire to minimize initial purchase price expenditures, employee training sessions, or other expenses by limiting the number of options that are activated. Later, as usage of the device increases, requests for access to inactivated options increase, or conditions suggest that it is favorable to have indefinite access to and use of particular inactivated options, then the facilities may request indefinite activation of one or more of the inactivated options. Therefore, there is a need for efficiently granting indefinite access to and use of inactivated options of a device located remotely from a centralized facility.

It would therefore be desirable to design a method and system for granting indefinite access to and use of inactivated software options resident on a device.

SUMMARY OF THE INVENTION

The present invention is directed to a system and method to permit indefinite use of inactivated software options resident on remotely located devices overcoming the aforementioned concerns.

The present invention comprises a system that utilizes hardware and software to receive a request from a user for access to and indefinite use of a software option that is inactivated, yet resident on a device. The system includes a device that is remote from a processing facility and has at least one software option that is controlled by a computer. A communications network connects the processing facility to a customer station such that the processing facility is capable of receiving and determining, based on a set of criteria, whether to grant indefinite use of the option. After determining whether the set of criteria has been met, the processing facility creates an activation key and transmits the activation key via the communications network from the processing facility to the device thereby permitting indefinite access to the software option. The communications network connects the customer station to the device through an external communications network, such as the Internet, direct dial-up, or a wireless platform.

In accordance with one aspect of the present invention, a method to permit indefinite use of inactivated software options resident on a device is disclosed and includes receiving at a centralized facility, a request from a user for indefinite use of an option resident on a device located remotely from the centralized facility. The method further includes the step of determining whether to grant indefinite use of an option based on whether a set of criteria have been satisfied, and, if so, generating an activation key configured to permit indefinite use of the option in response to an indefinite use grant. The method also includes transmitting an activation key from the centralized facility to the device, and automatically enabling user access to the option resident on the device in response to reception of the activation key.

In accordance with another aspect of the invention, a system to grant recurrent use of inactivated options is disclosed that includes a device having at least one software application residing thereon and at least one computer programmed to operate the software application. The system also includes a receiving center remotely located from the device and configured to receive a request from a user for recurrent use of an inactivated software application resident on the device. The system further includes transmitting an access code from the receiving center to the device and enabling recurrent use of the software application resident on the device.

In accordance with another aspect of the invention, a computer program is disclosed having a set of instructions which, when executed by a computer, causes the computer to receive a use request from a user. The use request includes a request to recurrently use a software application resident in memory of a device connected to a processing station via a public communication channel. A system identifier is received by the computer program and validated at the processing station. The computer then determines whether the user is qualified, and if so, generates an electronic enabler and transmits it to the device such that recurring use of the software application is available to the user.

The present invention further includes a computer data signal embodied in a carrier wave and representing a sequence of instructions which, when executed by a processor, causes the processor to receive, at a centralized facility, a request from a customer for recurrent use of a device capability of a device located remotely from the centralized facility. The processor further determines whether a customer is qualified, and if so, generates an activation signal designed to allow recurrent use of the device capability. The sequence of instructions further causes the processor to transmit the activation signal from the centralized facility to the device, such that the customer is permitted recurrent use of the device capability.

Various other features, objects and advantages of the present invention will be made apparent from the following detailed description and the drawings.

BRIEF DESCRIPTION OF THE DRAWINGS

The drawings illustrate a preferred embodiment as presently contemplated for carrying out the invention.

In the drawings.

DETAILED DESCRIPTION OF THE PREFERRED EMBODIMENT

Figure 1:
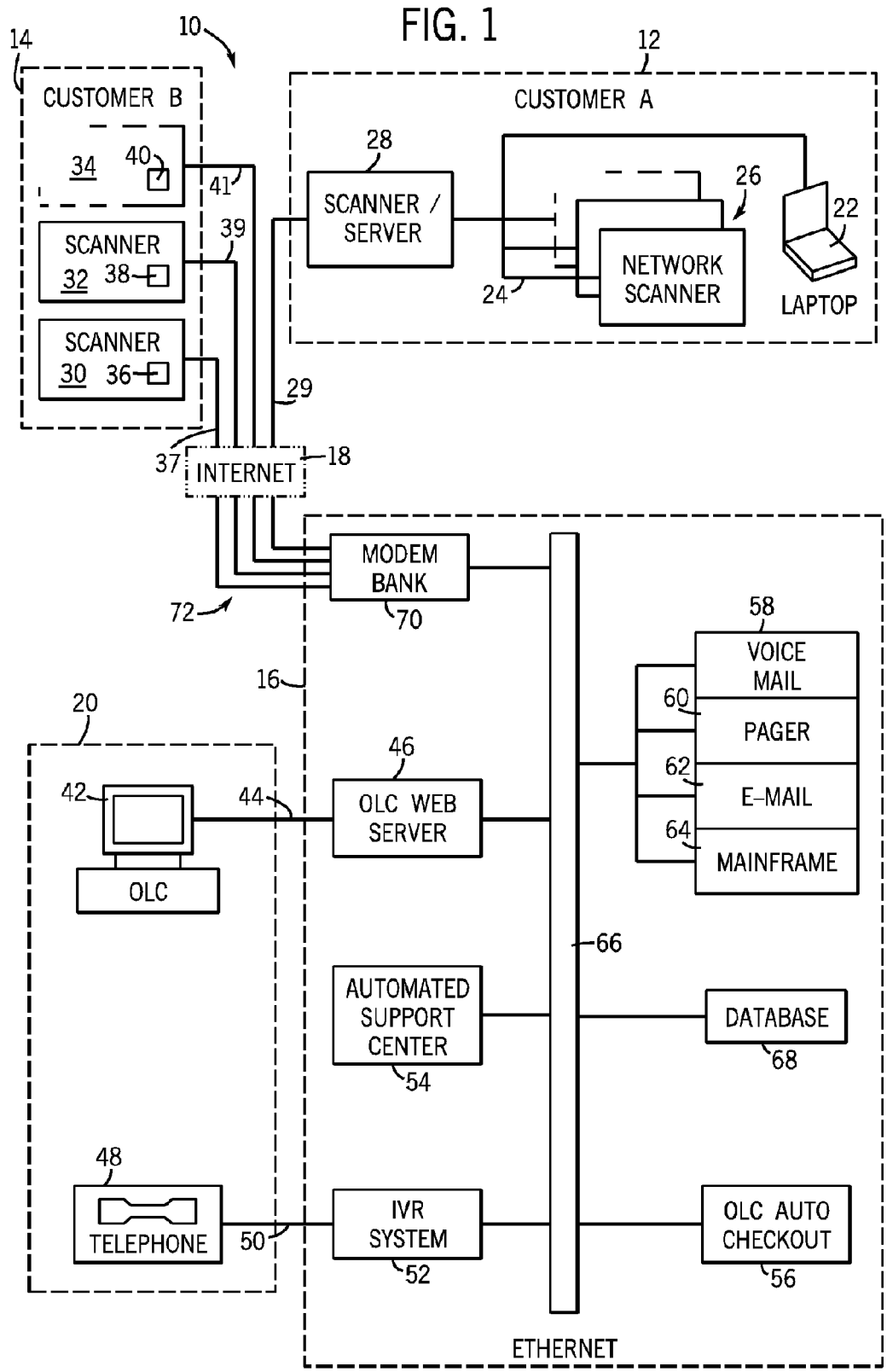
FIG. 1 is a block diagram of a system for which the present invention is implemented therein.

Referring to FIG. 1, an overview block diagram of a medical diagnostic and service networked system 10 is shown which includes a plurality of remote customer stations, such as Customer A referenced with numeral 12, and Customer B referenced with numeral 14. It is understood, that the number of customer stations can be limitless, but two specific embodiments are shown with Customer A and Customer B, which will be further explained hereinafter. The customer stations 12, 14 are connected to a processing station or centralized facility 16 through a communications link, such as a network of interconnected server nodes 18 or a remote link 20. Although a single centralized facility is shown and described, it is understood that the present invention contemplates the use of multiple centralized facilities or receiving centers, each capable of communication with each customer station. Each customer station has operational software associated therewith which can be configured, serviced, maintained, upgraded, monitored, enabled or disabled by the centralized facility 16.

The various systems disclosed are configured to be selectively linked to the centralized facility 16 by either the remote link 20, or in the example of customer station 12, a laptop computer 22 connected to an internal network 24 of Customer A. Such selective linking is desirable to provide upgrades, maintenance, service, and general monitoring of the various systems and equipment at a customer site, which includes accessing data from the systems and transmitting data to the systems, for example.

In general, a customer site may have a number of devices such as a variety of medical diagnostic systems of various modalities. As another example, in the present embodiment, the devices may include a number of networked medical image scanners 26 connected to an internal network 24 served by a single scanner 28 having a workstation configured to also act as a server, or configured as a stand-alone server without a medical image scanner associated therewith. Alternately, a customer station, or customer site 14 can include a number of non-networked medical image scanners 30, 32, and 34 each having a computer or work station associated therewith and having an internal modem 36, 38, and 40 to connect the remote customer station to a communications link, such as the Internet 18 through links 37, 39, and 41, respectively, to communicate with the centralized facility 16. Internet 18 is shown in phantom to indicate that an external communications network can include Internet 18, together with communication links 29, 37, 39, and 41, or alternatively, can include direct dial-up links through dedicated lines, an intranet, or public communications systems.

It is understood that each of the network scanners 26 has its own workstation for individual operation and are linked together by the internal network 24 so that the customer can have a centralized management system for each of the scanners. Further, such a system is provided with communications components allowing it to send and receive data over a communications link 29. Similarly, for the non-networked medical image scanners at remote customer station 14, each of the scanners 30, 32, and 34 have individual communications links 37, 39, and 41. Although FIG. 1 shows each of these links connected through an open network 18, these links can permit data to be transferred to and from the systems over a dedicated network as well.

The embodiment shown in FIG. 1 contemplates a medical facility having such systems as magnetic resonance imaging (MRI) systems, ultrasound systems, x-ray systems, computed tomography (CT) systems, as well as positron emission tomography (PET) systems, or any other type of medical imaging system, however, the present invention is not so limited. Such facilities may also provide services to centralized medical diagnostic management systems, picture archiving and communications systems (PACS), teleradiology systems, etc. Such systems can be either stationary and located in a fixed place and available by a known network address, or be mobile having various network addresses. In the embodiment shown in FIG. 1, each customer station 12, 14 can include any combination of the aforementioned systems, or a customer station may have all of a single type of system. A customer station can also include a single medical image scanner. Mobile diagnostic systems can be configured similarly to that of customer station 12 or customer station 14. Such mobile diagnostic systems can include equipment of various modalities, such as MRI, CT, ultrasound, or x-ray systems and are mobilized in order to service patients at various medical facilities.

A request for recurrent access, enablement, and use of software-based options of the present invention can be initiated by authorized personnel, such as an on-line engineer or technician, or customer administrative personnel from a computer or workstation 42 in the remote link 20, which can be a part of the centralized facility 16, or be separately connected to the centralized facility 16 by a dialup link 44 to a web server 46 in the centralized facility 16. Alternatively, it is contemplated that the system could be initialized by a laptop computer 22 connected to a customer internal network 24, or individually connected to each of the scanners 30, 32, or 34. The remote link 20 can also serve to connect the centralized facility 16 to a customer station by a telephone and telephone connection 48 through a conventional telephone network 50 and to an interactive voice recognition system (IVR) 52 in the centralized facility 16. The centralized facility 16 includes a number of processing systems including computers for the IVR system 52, an automated support center 54, the web server 46, and an auto checkout server 56, for processing customer and product data and creating an appropriate configuration file. Other processor systems include computers to maintain a voicemail system 58, a pager system 60, an email system 62, and a main frame 64, and more generally, an output report generator and notifier. Each is connectable and can transmit data through a network, such as an Ethernet 66 with one another, and/or with at least one database 68. However, it is understood that the single representation of a database in FIG. 1 is for demonstrative purposes only, and it is assumed that there is a need for multiple databases in such a system. It is also understood that the IVR system is not only a voice recognition system, but can also process interactive keypad entry from a touchtone telephone 48. A bank of modems 70 is connected to the Ethernet 66 to relay data from the centralized facility 16 to the remote customer stations 12, 14 through a plurality of modem links 72.

As previously discussed, each of the systems and substations described herein and referenced in FIG. 1 may be linked selectively to the centralized facility 16 via a network 18. According to the present invention, any acceptable network may be employed whether public, open, dedicated, private, or so forth. The communications links to the network may be of any acceptable type, including conventional telephone lines, fiber optics, cable modem links, digital subscriber lines, wireless data transfer systems, or the like. Each of the systems is provided with communications interface hardware and software of generally known design, permitting them to establish network links and exchange data with the centralized facility 16. The systems are provided with interactive software so as to configure the systems and exchange data between the customer stations and the centralized facility 16. In some cases, during periods when no data is exchanged between the customer stations and the centralized facility, the network connection can be terminated. In other cases, the network connection is maintained continuously.

The present invention includes a method and system for granting recurrent access to and indefinite use of resident software options in a remotely located device. As previously indicated, the device, including medical imaging equipment, includes installed software that controls options or device capabilities that are typically enabled or disabled manually by a field engineer on-site in response to a request for use of the options from a qualified customer. The present invention, however, is directed toward a method and system to remotely grant use of these resident options for an indefinite period upon satisfaction of a set of criteria, as defined by the centralized facility.

From a centralized facility, and after appropriate authentication of the user and validation of the system identification and customer's status, an electronic enabler or activation key is generated in the centralized facility 16 and electronically transmitted to a device via the communication links 29, 37, 39, 41, and/or 72, FIG. 1, preferably over a private communication link, but other public communications systems can work equally well, such as direct dial-up Internet, or wireless communications. As previously set forth, it is understood that the external communications links include a closed intranet system, an open public communications system, or a combination thereof.

Figure 2:
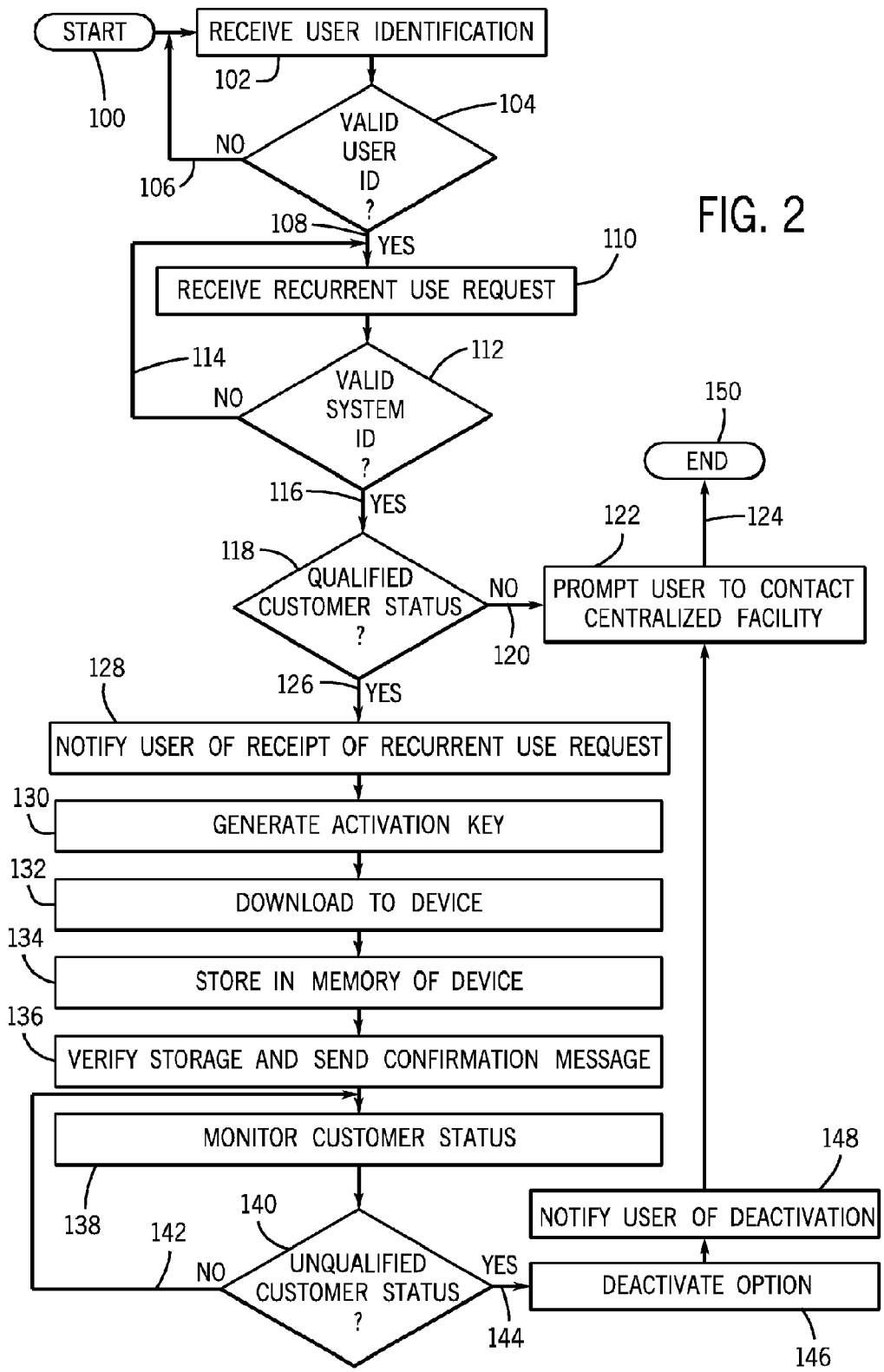
FIG. 2 is a flow chart showing a process of the present invention and implemented in the system of FIG. 1.

Referring to FIG. 2, once the method and/or computer program is initiated 100, customer identification is input electronically by a user or an authorized field engineer, at a remote customer station or a remote link, and received at the centralized facility 102. The centralized facility then validates the user identification at 104. Validation of the user identification is determined according to a user identifier and a password. If the user identification is not validated 106, the user is prompted to reenter a new user identifier and password at 102. If a valid user number is not received, a request will not be considered. After a user identification is validated 104, 108, the user selects a particular software option or device capability desired to be enabled and further requests indefinite or recurrent use. The request is then transmitted to the centralized facility. After the centralized facility receives the recurrent use request at 110, together with a system identifier identifying the particular device that the desired option resides on, such as any of the scanners 26-34, then the centralized facility validates the system identifier or system ID at 112. If the system identifier is invalid 114, e.g., does not indicate that the selected device is capable of supporting the software option requested, then the customer is prompted to enter a new system identifier at 110. If the system identification is valid 116, then the customer's status is verified at 118.

Whether to grant indefinite access to and use of an option in response to the recurrent use request is achieved by determining if a set of criteria defining the customer's status has been met. A customer's status may be qualified or favorable if the centralized facility determines that the set of criteria is appropriately satisfied. Once the set of criteria is determined to be satisfied, the customer's indefinite use request is approved, thereby granting recurrent access to and use of the options requested. Alternatively, if the customer fails to meet the set of criteria, or fails to maintain a qualified customer status by failing to comply with the set of criteria on a continual basis, the customer's status may be determined as unqualified or unfavorable and recurrent access to and use of the option may be terminated with deactivation of the option.

The set of criteria may include a number of parameters. For example, the criteria may require a current account balance or established line of credit. The set of criteria may also include data such as a valid user identifier, system identifier, software option identifier, and a recurrent use request identifier. In this manner, access to options can be limited to assure user observance of regulatory measures, proper use of new and/or updated options, and compliance with educational training programs and maintenance schedules. Furthermore, access to and use of the option may be denied for delinquent or past due account balances, unavailable credit, a poor credit history, or other accounting concerns. To further assist users or customers having an unqualified customer status 118, 120, the customer is prompted to contact a customer service representative at the centralized facility 122, FIG. 2. After receiving the information for contacting the centralized facility 122, the customer then exits the system at 124 and the algorithm ends 150. After a user has reinstated their customer status to qualified, then the user may start the system anew at 100.

Once the customer's status is determined as qualified 118, 126, then the user is notified of receipt of the recurrent use request at 128. Next, an activation key or electronic enabler is generated at 130. Alternatively, if desired, an automated billing invoice can be generated with the electronic enabler and sent to the centralized facility for further processing. After generation 130, the activation key is then downloaded 132 from the centralized facility to memory in the selected device 112, 116. The activation key is preferably an alphanumeric software key or code that is programmed to enable a specific software option on a particular device to prevent the possibility of unauthorized usage. A date/time stamp is embedded within the key causing the software to grant indefinite access to and use of the option. In an alternative embodiment, after generation of the activation key 130, an agreement or license granting access to and use of the device may be generated and sent to the customer that automatically terminates upon a change in a customer's status to unqualified.

After download 132, the activation key is stored in memory of the device 134 and the software option is enabled granting the customer indefinite access to and use of the option requested. Preferably, the system automatically verifies storage and the accessibility of the option and transmits an electronic verification message 136 from the centralized facility to the customer and/or the remote customer station. After message verification, the customer status is monitored 138. Next, a determination is made of whether customer status remains qualified or changes to unqualified 140. If the customer status is qualified 142, the system continues to monitor the customer status at 138. If the status changes to an unqualified customer status 140, 144, the customer facility transmits a disabling key to deactivate the option 146. The user is then notified of the deactivation 148, and prompted to contact the centralized facility at 122, at which point the algorithm ends 150.

Accordingly, the present invention includes a method to remotely permit indefinite use of software options resident on a device that includes receiving a request from a user at a centralized facility for recurrent use of an inactivated option resident on a device. Preferably, the access request is received via a communication interface to a centralized facility. Upon determination that a set of criteria has been met for a particular request, an activation key is generated and configured to permit recurrent access to and use of the option in response to an indefinite use grant. Preferably, the key permits access to software that is already installed in the device. Moreover, to provide increased security, the electronic enabler may be transmitted via a private communication interface from the centralized facility to the device. If desirable, however, a public communication interface can also be utilized. Ultimately, the method automatically enables customer access to and use of the option in the device in response to reception of the activation key. The method ensures proper granting of access by validating a user identifier and system identifier at the centralized facility and upon validation, transmitting a message from the centralized facility to a qualified customer verifying receipt of the request. The method includes denying user access to the option if the user has an unfavorable customer status or has failed to maintain a qualified customer status.

The invention includes a recurrent use system to grant indefinite use of inactivated software options that includes a device having a software application residing thereon and at least one computer programmed to operate the software application. The system also includes a receiving center remotely located from the device and configured to receive a request from a user for recurrent use of an inactivated software application resident on the device. The system further includes transmitting an access code from the receiving center to the device and enabling recurrent use of the software application resident on the device.

The invention further includes a computer program having a set of instructions which, when executed by a computer, causes the computer to receive a recurrent use request from a user requesting access to a software application resident in memory of a device connected to a processing station via a public communication channel. A system identifier is received by the computer program and validated at the processing station. Next, a determination is made regarding whether a user is qualified, and if so, an electronic enabler is generated and transmitted to the device such that recurring use of the software application is available to the customer or user.

The invention further includes a computer data signal embodied in a carrier wave and representing a sequence of instructions which, when executed by a processor, causes the processor to receive at a centralized facility, a request from a customer for recurrent use of an option of a device located remotely from the centralized facility. The set of instructions further cause the processor to determine whether a customer is qualified, and if so, generate an activation signal designed to allow recurrent use of the device capability, and transmit the activation signal from the centralized facility to the device, such that the customer is permitted recurrent use of the device capability.

The present invention has been described in terms of the preferred embodiment, and it is recognized that equivalents, alternatives, and modifications, aside from those expressly stated, are possible and within the scope of the appending claims.

What is claimed is:

1. A system to grant recurrent use of inactivated options comprising:
   a device having at least one disabled software application resident on a computer programmed to control an option of the device;
   a receiving center remotely located from the device and having a computer programmed to:
      receive a request from a user for recurrent use of the at least one disabled software application resident on the device computer;
      transmit an access code from the receiving center to the device;
      enable recurrent use of the at least one disabled software application resident on the device; and
      monitor a qualification status of the user while the at least one disabled software application remains enabled.

2. The system of claim 1 wherein the receiving center computer is further programmed to disable the enabled at least one disabled software application if the user is no longer qualified.

3. The system of claim 2 wherein the receiving center computer is further programmed to notify the user that the enabled at least one disabled software application has been disabled.

4. The system of claim 1 wherein the receiving center computer is further programmed to terminate qualification status monitoring when the enabled at least one disabled software application becomes disabled.

5. The system of claim 1 wherein the qualification status is one of qualified and disqualified.

6. The system of claim 5 wherein the qualification status indicates a disqualified status if the user fails to have at least one of a current account balance, an established line of credit, a valid user identifier, a valid system identifier, a valid software option identifier, and a recurrent use request identifier.

7. The system of claim 1 wherein the receiving center computer is further programmed to:
   receive a user identifier and validate the user identification;
   if the user identification is validated, receive a system identifier and validate the system identifier;
   if the system identifier is validated, grant recurrent use to the at least one disabled software application; and
   notify the user that recurrent use of the at least one disabled software application is granted.

8. The system of claim 1 wherein the receiving center computer is further programmed to:
  determine if a software application upgrade is available for the at least one disabled software application for which recurrent use has been requested; and
  notify the user of the availability to upgrade the at least one disabled software application.

9. The system of claim 1 wherein the receiving center computer receives the request through an open communication system and is further programmed to generate an alphanumeric key specific to at least one of a user identifier, a system identifier, a recurrent use identifier, and a software application identifier.

10. The system of claim 1 wherein the device includes at least one medical imaging device.

11. The system of claim 1 wherein the receiving center computer is further programmed to:
  determine whether the user is qualified, and if so;
  grant access to the at least one inactivated software application, and if not;
  deny access to the at least one inactivated software application.

12. A system to grant use of inactivated options comprising:
  a computer having a software application inactivated thereon;
  a receiving center remotely located from the computer and configured to:
    receive a request from a user for use of the inactivated software application;
    transmit an access code from the receiving center to the computer;
    activate use of the software application;
    determine a qualification status of the user; and
    automatically deactivate the activated software application if the user becomes unqualified.

13. The system of claim 12 wherein the receiving center is further configured to monitor the qualification status while the software application remains activated.

14. The system of claim 12 wherein the use is an indefinite use.

15. The system of claim 12 wherein the receiving center is further configured to notify the user that the software application has been deactivated.

16. The system of claim 12 wherein the qualification status indicates an unqualified status if the user fails to have at least one of a current account balance, an established line of credit, a valid user identifier, a valid system identifier, a valid software option identifier, and a recurrent use request identifier.

17. The system of claim 12 further comprising a medical image device connected to the computer.

18. A method to permit indefinite use of an inactivated option resident on a device comprising the steps of:
  receiving, at a centralized facility, a request from a user for indefinite use of an option resident on a device located remotely from the centralized facility;
  determining a user qualification status; and
  if the user qualification status indicates qualification, then:
    generating an activation key configured to permit indefinite use of the option;
    transmitting the activation key from the centralized facility to the device;
    automatically enabling user access to the option resident on the device in response to reception of the activation key; and
    monitoring the user qualification status while user access to the option remains enabled.

19. The method of claim 18 further comprising the steps of:
  automatically disabling the enabled option if the user qualification status indicates disqualification; and
  notifying the user that the enabled option has been disabled.

20. The method of claim 18 further comprising the steps of:
  notifying the user that the enabled option will be disabled; and
  automatically disabling the enabled option if the user qualification status indicates disqualification.

21. The method of claim 18 wherein the device is a medical imaging device.

22. The method of claim 18 wherein the user qualification status indicates a disqualified status if the user has one of a delinquent billing account, a lack of a line of credit, an inadequate credit history, and a failure to complete training requirements.

23. The method of claim 18 wherein the user qualification status indicates a qualified status if the user has a non-delinquent billing account.

* * * * *